United States Patent [19]

Kostamo et al.

[11] Patent Number: 4,733,621
[45] Date of Patent: Mar. 29, 1988

[54] APPARATUS AND METHODS FOR OPERATING A FLUIDIZED BED REACTOR

[75] Inventors: Markku Kostamo; Martti Puhakka, both of Varkaus, Finland

[73] Assignee: A. Ahlstrom Corporation, Karhula, Finland

[21] Appl. No.: 47,308

[22] Filed: May 8, 1987

[51] Int. Cl.$^4$ .............................................. F23D 1/00
[52] U.S. Cl. ................... 110/347; 110/245; 122/4 D
[58] Field of Search ............... 110/245, 346, 347; 122/4 D; 431/170, 7; 165/104.16

[56] References Cited

U.S. PATENT DOCUMENTS

| | | |
|---|---|---|
| 3,840,353 | 10/1974 | Squires . |
| 4,442,797 | 4/1984 | Strohmeyer, Jr. . |
| 4,457,289 | 7/1984 | Korenberg .................. 122/4 D |
| 4,473,032 | 9/1984 | Maintok ...................... 122/4 D |
| 4,522,154 | 6/1985 | Taylor et al. . |
| 4,593,630 | 6/1986 | Teigen ........................... 110/245 |
| 4,594,967 | 6/1986 | Wolowodiuk ................ 122/4 D |
| 4,672,918 | 6/1987 | Engstrom et al. ........... 122/4 D |

Primary Examiner—Edward G. Favors
Attorney, Agent, or Firm—Nixon & Vanderhye

[57] ABSTRACT

A fluidized bed reactor has a pair of cyclone separators which receive flue gas with entrained solids and wherein the solids are separated from the flue gas in the separators for flow into a fluidized distribution conduit. The flow of separated particles is divided into two particle streams and fluidizing air is introduced into the duct. The fluidized separated particles are then conveyed to the combustion chamber of the reactor through an upright conduit in turn connected to a downwardly inclined conduit connecting the combustion chamber with the fluidized separated particles in the duct. The downwardly inclined conduits are substantially equidistantly distributed along the lateral extent of the combustion chamber to provide even distribution of the solid separated particles with fuel mixed therein in the combustion chamber.

20 Claims, 5 Drawing Figures

APPARATUS AND METHODS FOR OPERATING A FLUIDIZED BED REACTOR

BACKGROUND AND SUMMARY OF THE INVENTION

The present invention relates to apparatus and methods for operating a fluidized bed reactor having a separator for separating entrained solid particles from the flue gas and recycling the separated particles to the reactor chamber. Particularly, the separated recycled particles are fluidized before reentry into the reactor chamber and conveyed to reactor chamber inlets for even distribution of the recycled particles along the chamber bed.

Fluidized bed reactors having separators, for example of the cyclone type, for separating entrained solid particles from flue gas and recycling the separated particles back to the combustion chamber of the reactor are well known. Examples of such systems are set forth in U.S. Pat. Nos. 4,522,154 and 4,442,797. In the former patent, the particles separated in the cyclone separator are recycled to the reactor through a loop seal which prevents backflow of gas from the combustion chamber to the cyclone separator. In U.S. Pat. No. 4,442,797, fuel is supplied to the separated particles as these particles are recycled back for flow into the combustion chamber of the reactor.

In general, however, it is difficult to obtain even distribution of the separated recycled particles upon their return to the combustion chamber of the fluidized bed reactor. It will be appreciated that the recycled particles include unburned solid fuel. From an efficiency standpoint, it is desirable to distribute that unburned fuel and other particles evenly throughout the combustion chamber. This is particularly difficult in fluidized bed reactors which have large cross-sectional areas. Thus, as the recycled particles are introduced through one wall of the reactor chamber, there will be areas of the combustion bed, particularly in large reactors, which will not receive any of the separated particles or which will receive such separated particles, but to a lesser extent than other areas of the chamber.

It is possible to provide additional cyclone separators for use with a fluidized bed reactor whereby the separated particles from the respective separators may be disposed in the combustion chambers at different locations. However, while this permits the construction of fluidized bed reactors of substantial size, the costs of the cyclone separators practically limit the employment of such system as a solution to the problem of uneven distribution of the recycled separated particles in the combustion chamber. Moreover, the problem of distribution in the reactor chamber is exacerbated when it is realized that fuel should be added to the recycled separated particles to promote uniformity of combustion in the chamber.

According to one aspect of the present invention, there is provided a method of operating a circulating fluidized bed reactor having a separator for removing entrained solid particles from the flue gas including the steps of conducting the particles separated in the separator for flow from the separator into a chamber. In the chamber, the separated particles are fluidized and divided into separate particle streams. The separate particle streams are then introduced into the fluidized bed reactor at different inlet locations to distribute the separated particles substantially evenly along the fluidized bed reactor. Preferably, fuel is mixed into each of the streams of separated particles prior to their entry into the combustion chamber. The fluidization of the separated particles in the chamber includes injecting a fluid, for example air, into the chamber to maintain the separated particles in a fluidized state. The fluid injected into the fluidizing chamber serves also to assist in conveying the separated particles from the fluidizing chamber into the combustion chamber through conduits in which fuel may be introduced. Thus, in accordance with this method, the separate particle streams may be introduced at longitudinally spaced locations along the length of any wide wall of the fluidized bed reactor on any wall whereby substantial even distribution of the separated particles and fuel mixture is achieved.

According to another aspect of the present invention, there is provided an apparatus enabling the even distribution of the separated recycled particles in a fluidized bed combustion chamber. Preferably, such apparatus includes a reaction chamber, a discharge means for removing a flue gas with entrained solid particles from the reactor chamber, a cyclone separator connected to the discharge means for separating the solid particles from the flue gas, together with means for recycling at least a portion of the separated particles to the reactor chamber, including a loop seal having means for dividing at least a portion of the separated particles into separate particle streams and connecting the particle streams to the reactor chamber. In this preferred embodiment of the present invention, a pair of separators are provided, each having its lower end connected by a standpipe with a distribution chamber comprised of a generally horizontally extending duct, the standpipe and the duct forming essentially a T-connection. Conduits extend upwardly from the opposite ends of each duct, terminating in inclined conduits for connection with the combustion chamber. Plenum chambers are provided below the duct and nozzles and provide fluidizing gas, for example air, into the duct to maintain the separated particles received from the separators in a slow fluidized state. Thus, the fluidized separated particles are transmitted by the action of the inlet fluid through the end conduits into the inclined conduits. Fuel inlet ports are provided in the inclined inlets whereby the fuel and separated particles are mixed and conveyed to the combustion chamber. The lower ends of the inclined conduits terminate in inlets located substantially evenly throughout the length of the combustion chamber whereby even distribution of the separated particles/fuel mixture is obtained.

Accordingly, it is a primary object of the present invention to provide novel and improved methods and apparatus for recycling particles separated from flue gas generated by a fluidized bed reactor in a manner in which the recycled separated particles and the fuel mixed therewith are substantially evenly distributed in the combustion chamber.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

Figure 1:
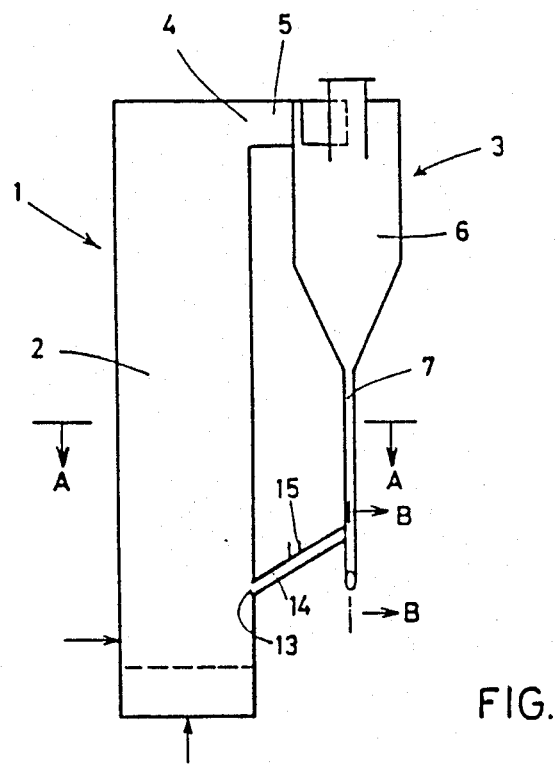
FIG. 1 is a schematic side elevational view of a fluidized bed reactor and cyclone separators illustrating the manner in which the separated particles are returned to the combustion chamber.
Figure 2:
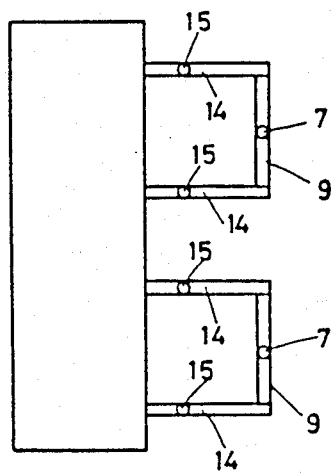
FIG. 2 is a cross-sectional view thereof taken generally about on line A—A in FIG. 1.

Referring now to FIG. 1, there is illustrated a fluidized bed reactor, generally designated 1, having a reactor or combustion chamber 2. The fluidized bed reactor 20 may be a gasifier, a combustor, a steam generator, or any other similar type of apparatus as those skilled in the art will recognize. Primary and secondary gases are supplied through the bottom and the side walls of the reactor chamber, by means not shown. A pair of cyclone separators 3 lie in communication with the upper end of the reactor chamber 2 through a pair of ports 4. Ducts 5 connect the discharge ports 4 with the cyclone separators 3. The flue gas is thus discharged from the combustion chamber 2, through the ports 4 and ducts 5 into the cyclone chambers 6 of the respective separators, the ducts 5 transmitting the flue gas with entrained solid particles tangentially of and into the cyclone chambers 6. The cyclone separators 3 are of conventional construction and separate the hot flue gases from the solid particles, which are gravity-fed to the lower end of the chambers 6.

Figure 3:
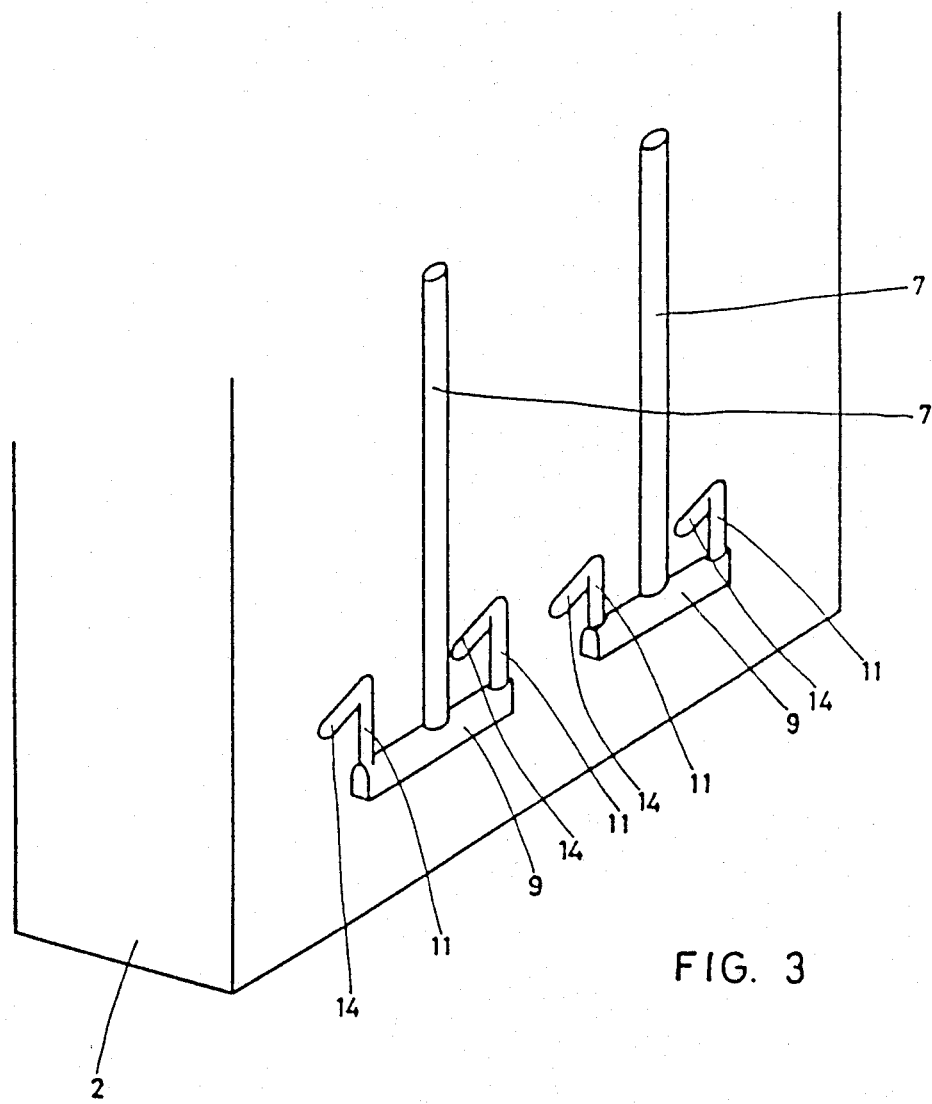
FIG. 3 is a fragmentary enlarged perspective view of the lower end of the fluidized bed reactor illustrating the separated particle distribution conduits.
Figure 4:
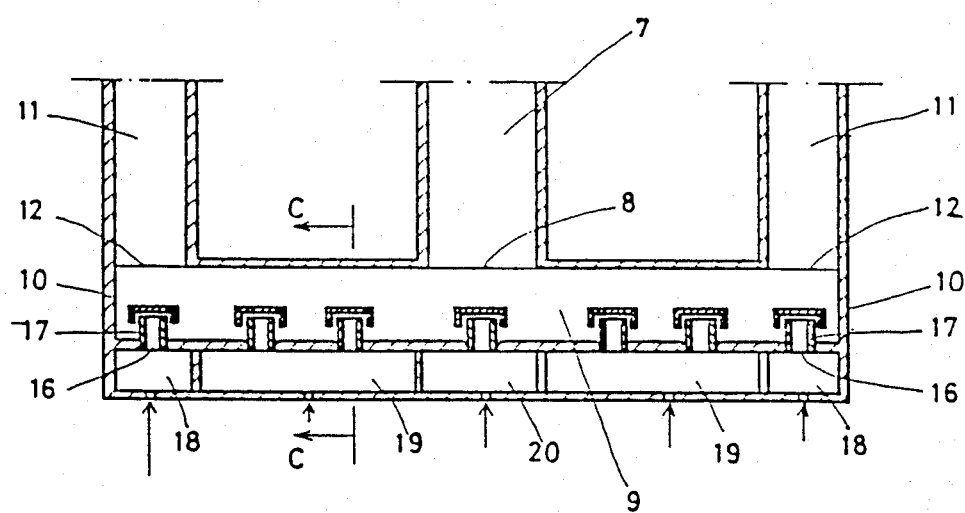
FIG. 4 is an enlarged fragmentary cross-sectional view taken generally about on line B—B in FIG. 1.
Figure 5:
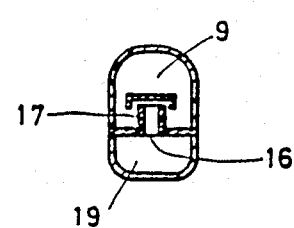
FIG. 5 is an enlarged cross-sectional view taken about on line C—C in FIG. 4.

Each of the cyclone separators 6 has the upper end of a standpipe 7 connected to the lower end of the conical part of the separator wherein the solid particles are collected. The opposite or lower end of each standpipe 7, as best illustrated in FIG. 4, has an outlet opening 8 intermediate the ends of a horizontal chamber or duct 9 having end walls 10. That is, the standpipe 7 and the horizontal chamber or duct 9 form an inverted T-shaped flow conduit in which the standpipe forms the stem and the horizontal duct forms the cross arms. The lower end of each standpipe 7 opens through the upper side of the duct 9 and the lower ends of two substantially vertically extending conduits 11 connect through openings 12 with the conduit or chamber 9 at its opposite ends. The upper ends of the conduits 11, as best illustrated in FIG. 3, connect with the upper ends of inclined conduits 14, the lower ends of which open into the combustion chamber through inlet ports 13. Also, fuel inlet conduits 15 are coupled intermediate the ends of conduits 14 for admitting fuel to the separated particles, as discussed below.

Referring now to FIG. 4, the bottom of duct or chamber 9 is provided with a plurality of openings 16 in which are disposed distribution nozzles 17 for communicating air from plenum chambers located below duct or chamber 9 into the latter for purposes of fluidizing the separated particles. Particularly, five plenum chambers are provided below duct or chamber 9. Chambers 18 are provided adjacent the opposite ends of the duct 9 and chambers 19 are disposed between end plenum chambers 18 and a central plenum chamber 20. With this arrangement, the central plenum chamber lies opposite the outlet 8 of standpipe 7, while the end plenum chambers 18 lie opposite ports 12. The plenum chambers are connected to a source of fluid under pressure, for example, pressurized air. It will be appreciated that the air supplied each of the plenum chambers can be separately controlled, as desired. Suitable covers are provided on top of the nozzles 17 to prevent the separated particles from entering the plenum chambers.

In operation, the flue gases and solid particles entrained in the flue gases as a result of the combustion in the fluidized bed reactor flow to the upper end of the reactor, where they are conveyed into the cyclone separators 3 via ports 4 and ducts 5. Particles in the flue gas stream are separated from the flue gas and collected adjacent the walls of the cyclone chambers 6. From there, the separated particles flow into standpipe 7.

As illustrated in FIG. 4, the separated particles at the lower end of each standpipe 7 are divided into two equal particle streams in the horizontal chamber or duct 9, one stream flowing to the left and the other stream flowing to the right, as illustrated in that drawing figure. The duct or chamber 9 is fluidized by the introduction of fluid, i.e., air, injected through the nozzles 17 from the plenum chambers 18, 19 and 20. Thus, the duct or chamber 9 establishes a low pressure fluidized state adjacent the lower end of the standpipe 7. The horizontal duct 9 and the upright pipes 11 form a loop seal, enabling flow of separated particles from the separator to the reaction chamber through the loop seal. This flow is controlled by the gas flowing in plenum chambers 18–20 and nozzle 17. By controlling the flow of gas, control over the flow of separated particles into the reactor chamber is also achieved. For example, if fluid flow from plenum chambers 18–20 through nozzle 17 is cut off, the flow of separated particles will similarly be cut off from the reactor chamber. A valve may be provided in each inclined conduit 14 to assist in the control of the recycling of the solid particles back to the reaction chamber. As the separated particles flow through conduits 11 and conduits 14, fuel may be added through conduits 15 and mixed with the particle streams.

It will be appreciated, from a review of FIG. 3 particularly, that the inlet ports 13 adjacent the lower ends of the conduits 14 are located along the length of the combustion chamber substantially equidistantly to facilitate the even distribution of the separated particles/fuel mixture in the combustion chamber.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a circulating fluidized bed reactor having a separator for removing entrained solid particles from the flue gas comprising the steps of:
    (a) conducting particles separated in said separator for flow from said separator into a chamber;
    (b) fluidizing said separated particles in said chamber;
    (c) dividing the particles in said chamber into separate particle streams; and
    (d) introducing said separate particle streams into the fluidized bed reactor at different inlets thereto to distribute the separated particles substantially evenly along said fluidized bed reactor.

2. A method according to claim 1 wherein the separated particles from said separator are divided into two separate particle streams.

3. A method according to claim 1 including mixing fuel with the separated particles.

4. A method according to claim 1 including mixing fuel with the separated particles in each of the separate particle streams.

5. A method according to claim 1 including the step of mixing fuel with said particle streams before the particle streams are introduced into the fluidized bed reactor.

6. A method according to claim 1 wherein the step of fluidizing includes injecting a fluid into said chamber to maintain said separated particles in a fluidized state in said chamber.

7. A method according to claim 1 including the step of controlling the flow of the separate particle streams into said fluidized bed reactor.

8. A method according to claim 1 including providing a fluidized bed reactor having a predetermined lateral extent, locating said inlets at substantially equal increments of length along the lateral extent of said reactor, thereby to provide substantially even distribution of the separate particles therealong.

9. A method according to claim 1 including conducting the particles separated in said separator for flow from the separator through a standpipe for introduction thereof into said chamber.

10. A fluidized bed reactor comprising:
(a) a reactor chamber:
(b) discharge means for removing a flue gas with entrained solid particles from said reactor chamber;
(c) a cyclone separator connected to said discharge means for separating said solid particles from said flue gas; and
(d) means for recycling at least a portion of the separated particles to said reactor chamber, said recycling means including a loop seal having means for dividing the at least portion of the separated particles into separate particle streams and connecting said separate particle streams to said reactor chamber for distributing the separated particles substantially evenly along said reactor chamber.

11. Apparatus according to claim 10 wherein said recycling means includes a standpipe connecting between the lower end of said separator and said loop seal and conveying means connecting between said loop seal and the lower end of said reactor chamber.

12. An apparatus according to claim 11 wherein said standpipe and said dividing means form a generally T-shaped branch pipe having a stem and aligned cross-arms, said standpipe forming said stem and a horizontal duct forming said cross-arms.

13. An apparatus according to claim 12 including means in said horizontal duct connected to a source of pressurized fluid for fluidizing the separate particles disposed in said duct.

14. An apparatus according to claim 13 wherein said fluidizing means includes a plenum chamber and means defining a plurality of fluid distribution nozzles for directing fluid from said plenum chamber into said horizontal duct.

15. An apparatus according to claim 12 wherein the lower end of a generally upright conduit is connected adjacent each end of said horizontal duct and an inclined conduit connecting the upper ends of said conduits to the lower end of the reactor chamber.

16. An apparatus according to claim 15 including a conduit connected to said inclined conduit for introducing fuel into the reactor chamber.

17. A fluidized bed reactor comprising:
(a) a reactor chamber;
(b) discharge means for removing a flue gas with entrained solid particles from said reactor chamber;
(c) a cyclone separator connected to said discharge means for separating said solid particles from said flue gas; and
(d) means for recycling at least a portion of the separated particles to said reactor chamber, said recycling means including means for fluidizing the separated portion into discrete particle streams, and means for connecting said separate particle streams with said reactor chamber for distributing the separated particles substantially evenly along said reactor chamber.

18. An apparatus according to claim 17 wherein said fluidizing means includes a plenum chamber and means defining a plurality of fluid distribution nozzles for directing fluid from said plenum chamber into said horizontal duct.

19. An apparatus according to claim 17 including means for introducing fuel into said particle streams whereby a mixture of recycled particles and fuel in said particle streams are provided said reactor chamber.

20. Apparatus according to claim 17 wherein said recycling means includes a standpipe connecting between the lower end of said separator and said fluidizing means and conveying means connecting between said fluidizing means and the lower end of said reactor chamber, said standpipe and said dividing means forming a generally T-shaped branch pipe having a stem and aligned cross-arms, said standpipe forming said stem and a horizontal duct forming said cross-arms.

* * * * *